United States Patent
Rooke

(10) Patent No.: US 6,644,237 B2
(45) Date of Patent: Nov. 11, 2003

(54) VARIABLE GEOMETRY SEASONING TUMBLER

(75) Inventor: Robert James Rooke, Plano, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 10/078,050

(22) Filed: Feb. 19, 2002

(65) Prior Publication Data
US 2003/0154914 A1 Aug. 21, 2003

(51) Int. Cl.[7] .............................. A23G 3/00; B05C 19/04
(52) U.S. Cl. ....................... 118/19; 118/24; 118/308; 118/324; 118/417; 118/494; 99/494
(58) Field of Search .............................. 118/19, 24, 308, 118/324, 417, 425, 426; 426/295, 289; 366/271; 99/494

(56) References Cited

U.S. PATENT DOCUMENTS

| | | | |
|---|---|---|---|
| 3,412,982 A | * | 11/1968 | Feterl .......................... 366/184 |
| 3,635,326 A | | 1/1972 | Langlinais |
| 3,692,282 A | * | 9/1972 | Niblo .......................... 366/131 |
| 3,715,840 A | * | 2/1973 | Davidson .................... 451/326 |
| 4,023,521 A | * | 5/1977 | Booth .......................... 118/16 |
| 4,270,486 A | | 6/1981 | Leverenz |
| 4,419,953 A | | 12/1983 | Fowler |
| 4,543,907 A | | 10/1985 | Fowler |
| 4,576,108 A | | 3/1986 | Socola et al. |
| 4,597,358 A | | 7/1986 | Aitken |
| 4,614,162 A | | 9/1986 | Ryan et al. |
| 4,702,609 A | * | 10/1987 | Houle .......................... 366/184 |
| 4,907,720 A | | 3/1990 | Henson et al. |
| 5,090,593 A | | 2/1992 | Ejike |
| 5,386,939 A | | 2/1995 | Ruegg |
| 5,707,448 A | | 1/1998 | Cordera et al. |
| 5,728,216 A | * | 3/1998 | London .......................... 118/13 |
| 5,846,324 A | | 12/1998 | Marshall et al. |

* cited by examiner

Primary Examiner—Laura Edwards
(74) Attorney, Agent, or Firm—Colin P. Cahoon; Carstens, Yee & Cahoon, L.L.P.

(57) ABSTRACT

The variable geometry seasoning tumbler is an adjustable tumbling device that allows for the uniform application of seasoning of snack food product such as potato chips, tortilla chips, corn chips, and the like. With the adjustable tumbling device, uniform application of seasoning can be achieved while minimizing snack food product breakage. The tumbler has adjustable upper and lower rolls that support a belt that receives and processes the snack food product. The belt has a catenary region wherein snack product is processed in a tumbling bed. By adjusting one or both rolls, the dimensions of the tumbling bed and the inclination of the belt can be easily modified. Thereby, the tumbling parameters can be optimized for each type of snack product being seasoned.

23 Claims, 3 Drawing Sheets

VARIABLE GEOMETRY SEASONING TUMBLER

BACKGROUND OF THE INVENTION

1. Technical Field

The present invention relates to an apparatus for applying seasoning to snack food products such as potato chips, tortilla chips, corn chips, and the like. More particularly, the invention relates to an apparatus for applying seasoning uniformly by having an adjustable configuration that minimizes snack food product breakage during application.

2. Description of Related Art

Snack food products, particularly seasoned snacks, are popular snack choices with consumers. For example, potato chips, tortilla chips, corn chips, and the like are seasoned prior packaging. To season, snack food products are typically seasoned by sprinkling one or more seasonings onto the surface of the snack food products while being tumbled in a drum type tumbler. The seasonings for snacks include salt, barbecue flavoring, sour cream and onion flavor, vinegar flavor, cheese, and others.

Seasoning is spread onto the snacks by sprinkling on the surface of the products while being tumbled after they have been cooked. The application and distribution of the seasoning onto the snacks is a factor in product quality. If the seasoning is not distributed evenly onto the snacks, some snacks receive excessive amounts of the desired quantity of seasoning while others receive less than desired amounts of seasoning. Achieving the optimum compromise between uniform seasoning coverage of the snack product along with minimum product breakage requires selection of a tumbler drum with a particular design. Factors involved in the proper selection include length, diameter, lifting flight design, tumbling RPM, and inclination angle. This depends on the size, shape, bulk density, and production rate of the particular snack product being seasoned. Often, a tumbler drum must be used that is not ideal because the drum seasons a variety of different products. This results in a higher than necessary product breakage and sub-optimal seasoning coverage. Basically, the overall quality of the snacks will be poor if the seasoning is not applied evenly or if a significant amount of snack product is broken. In addition to the aesthetic aspects of seasoning distribution, economics suffer if the seasoning is applied inefficiently or if snack product is broken.

In FIG. 1, a prior art seasoning applicator 10 is shown for seasoning snack food products 12. Unseasoned snack food products 12 enters cylindrical tumbling drum 14 at one end through a funnel 18. The end of the drum 14 through which the snack food products 12 are introduced is elevated with respect to a discharge end 20. Thereby, snack food products 12 are moved by gravity toward discharge end 20. As drum 14 is axially rotated, baffles 16, which extend longitudinally along the interior surface of drum 14, lift food products 12 to aid in applying the seasoning. A seasoning dispenser 22 has a tube portion 24 that extends into drum 14. Within tube 24 is an auger 26 that is in communication with seasoning hopper 30. As auger 26 is spun, seasoning from hopper 30 is carried through tube 24 and exits through apertures 32 which are disposed on a portion of tube 24 that extends into drum 14. As seasoning is supplied into drum 14, a seasoning curtain 34 is formed through which snack food products 12 pass through.

As shown in the prior art device of FIG. 1, conventional seasoning devices utilize a tumbling drum to assist in apply seasoning onto snack food products. To achieve a uniform amount of seasoning over snack product, the snack product must be tumbled in a tumbler with the proper characteristics, as described above. As it is more economical to use a single production line to make a variety of snack products, not all snack products are seasoned as uniformly as would otherwise be desired. This is because with a variety of snack products having different sizes, shapes, and other characteristics are made with a single production line, one tumbler must be selected that will best season all the different products. The result of this seasoning is often sub-optimal coverage and product breakage.

Consequently, a need exists for a tumbling bed device that will assist in providing uniform seasoning coverage onto snack products while minimizing product breakage. An applicator that can be modified to accommodate the different products to be seasoned with a single production line is desired. Thereby, snack products with uniform seasoning coverage can be produced while avoiding product breakage.

SUMMARY OF THE INVENTION

An exemplary embodiment of the invention is for a seasoning tumbler for applying seasoning onto snack food products such as potato chips, tortilla chips, corn chips, and the like. The seasoning tumbler has an adjustable geometry in that a belt suspended between an upper and lower rolls that are each adjustable forms the tumbling bed. The belt extends transversely across a predetermined width wherein a slack portion, catenary portion, is formed in the belt. To support the rolls, support arms are provided at least at one for holding the rolls cantilevered or, alternatively, support arms are provided at each side of the rolls.

Snack food products fed onto the belt are tumbled in the catenary portion which is formed on a top portion of the belt. To form the catenary portion, the upper roll is suspended higher and backward from the lower roll. The belt is rotated by motion of the lower roll thereby creating the slack region. By having the entry point of the snack food product onto the belt higher than its departure point, the snack food product will travel along the belt in a downward manner. As snack food product is lifted up along with the belt, the product reaches a point where it is overcome by gravity and falls back toward the lower roll. The snack food product is then captured by the moving belt to repeat this tumbling pattern. To aid the lifting of the product by the belt, flights or cleats can be optionally provide transversely and intermittently across the belt.

Advantageously, the geometry of the tumbling region is adjustable to optimize the application of the seasoning depending on the type of product being seasoned. For example, the inclination of the belt is adjusted by adjusting the slope with movement of both rolls. Thereby, the tumbling time can be increased or decreased as needed. To adjust the curvature of the catenary portion, the top roll can be moved either toward or away from the bottom roll. Thereby, the tumbling bed can be made deeper or shallower. With the adjustability of the tumbling bed, multiple types of snack food can be seasoned uniformly with one production line while minimizing product breakage.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Seasoned snack food products are produced with a tumbling bed device in accordance with the invention are coated with seasoning. In practice, snack food products, such as potato chips, corn chips, tortilla chips, puffed-extruded cornmeal, or the like, are seasoned prior to being packaged for sale to consumers. With the tumbling bed device made and used in accordance with the invention, seasoning applied to snack food products with a seasoning dispenser are tumbled on the tumbling bed device that can be modified depending on the snack products' parameters.

Figure 1:
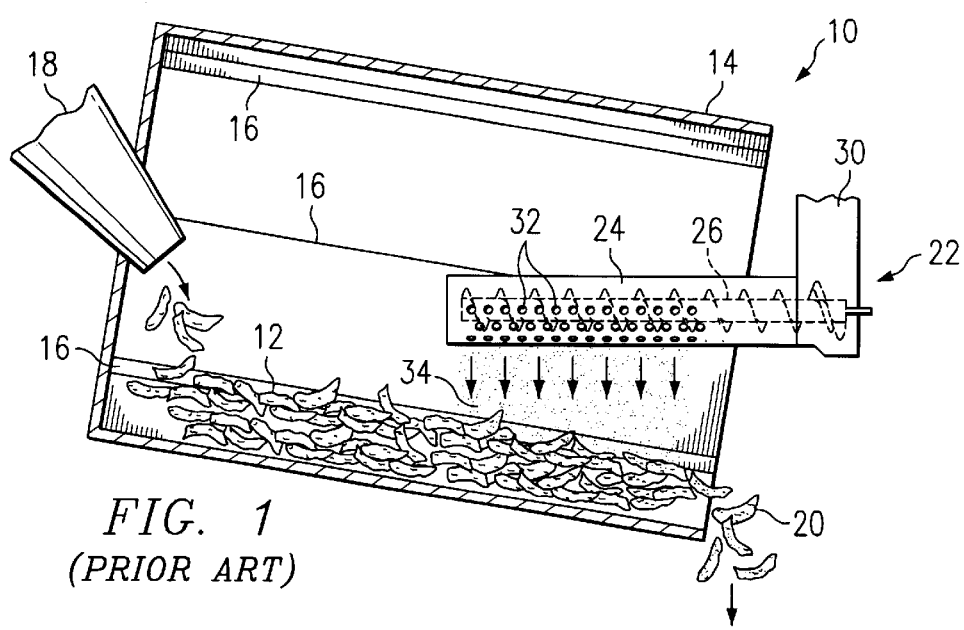
FIG. 1 is a cross-sectional side view of a rotating tumbling drum of the prior art applying a curtain of seasoning.
Figure 2:
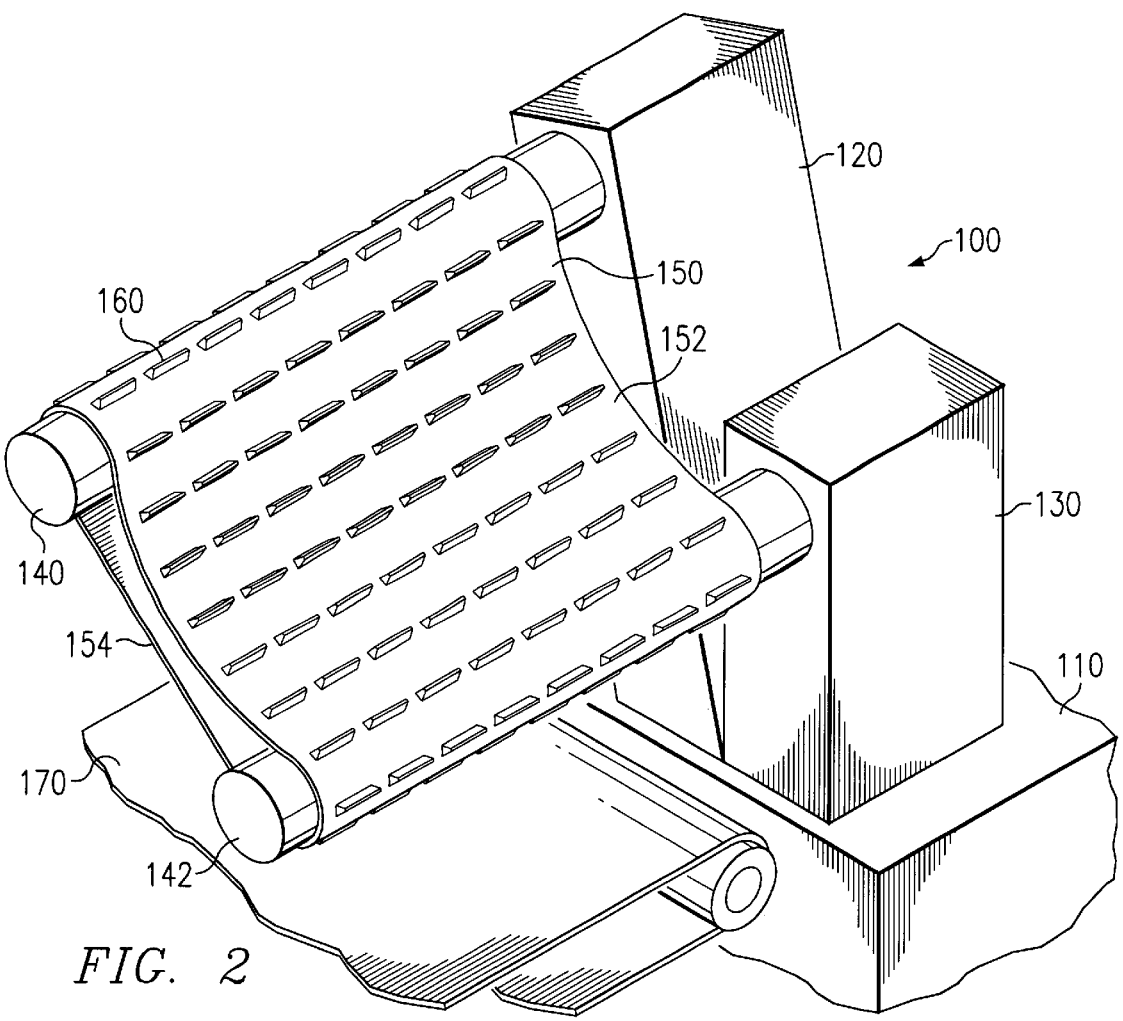
FIG. 2 is a top perspective view of a variable geometry seasoning tumbler of the invention.

FIG. 2 shows a preferred embodiment of the invention of variable geometry seasoning tumbler 100. A support base 110 has ascending support arm 120 for upper support roll 140 and ascending support arm 130 for lower support roll 142. The support rolls 140 and 142 can comprise drum rollers or large diameter sprockets. These rolls 140, 142 may be retained by shafts (not shown) that are held cantilevered as shown by support arm 120, 130. Alternatively, rolls 140, 142 may be supported at the end, which is shown unattached in FIG. 2, by another set of support arms (not shown). These rolls 140, 142 support and retain belt 150 such that belt 150 has a catenary portion 152 and a taut portion 154. The catenary portion 152 is slack to allow snack food product to be tumbled within this region. On belt 150, flights 160 are provided along the surface in a transverse pattern for picking up snack food product being tumbled by tumbler 100. While belt 150 is shown with flights 160, alternative protrusions such as cleats may be used to aid in tumbling the snack food product. Positioned beneath a portion of belt 150 is conveyor belt 170 for receiving tumbled snack food product from belt 150.

The variable geometry seasoning tumbler 100 can be made from conventional materials such as metal, plastic, and other materials. Particularly, rolls 140,142 are generally comprised a durable material that can withstand the rotation and contact with belt 150. Likewise, belt 150 is generally comprised of a durable material capable of withstanding rotation and contact by rolls 140, 142 and contact with snack food product that can have an elevated temperature above ambient. Belt 150 is rotated by rolls 140, 142 and is rotated in the direction towards upper roll 140. Rotation is provided through the rotation of lower roll 142 to create the slack portion of catenary portion 152. Lower roll 142 can be rotated by a drive mechanism supplied through ascending support arm 130. By adjusting the speed of rolls 140, 142, the tumbling action, product residence time in the product tumbling bed (region of tumbling) of belt 150, and the product tumbling bed depth.

Figure 3:
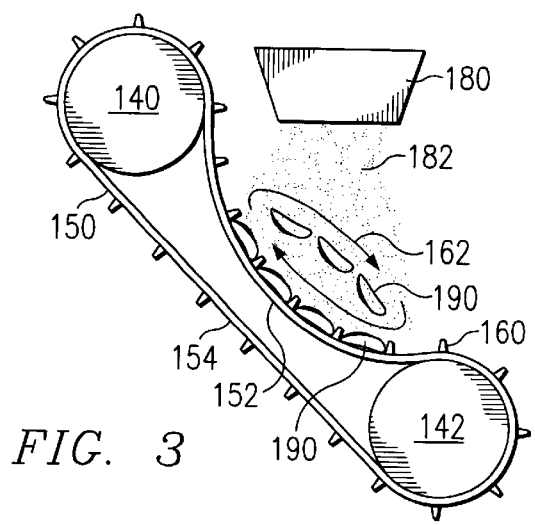
FIG. 3 is a cross-sectional view of the variable geometry seasoning tumbler in FIG. 2 along showing the motion of the tumbling bed of snack food product being seasoned.
Figure 4:
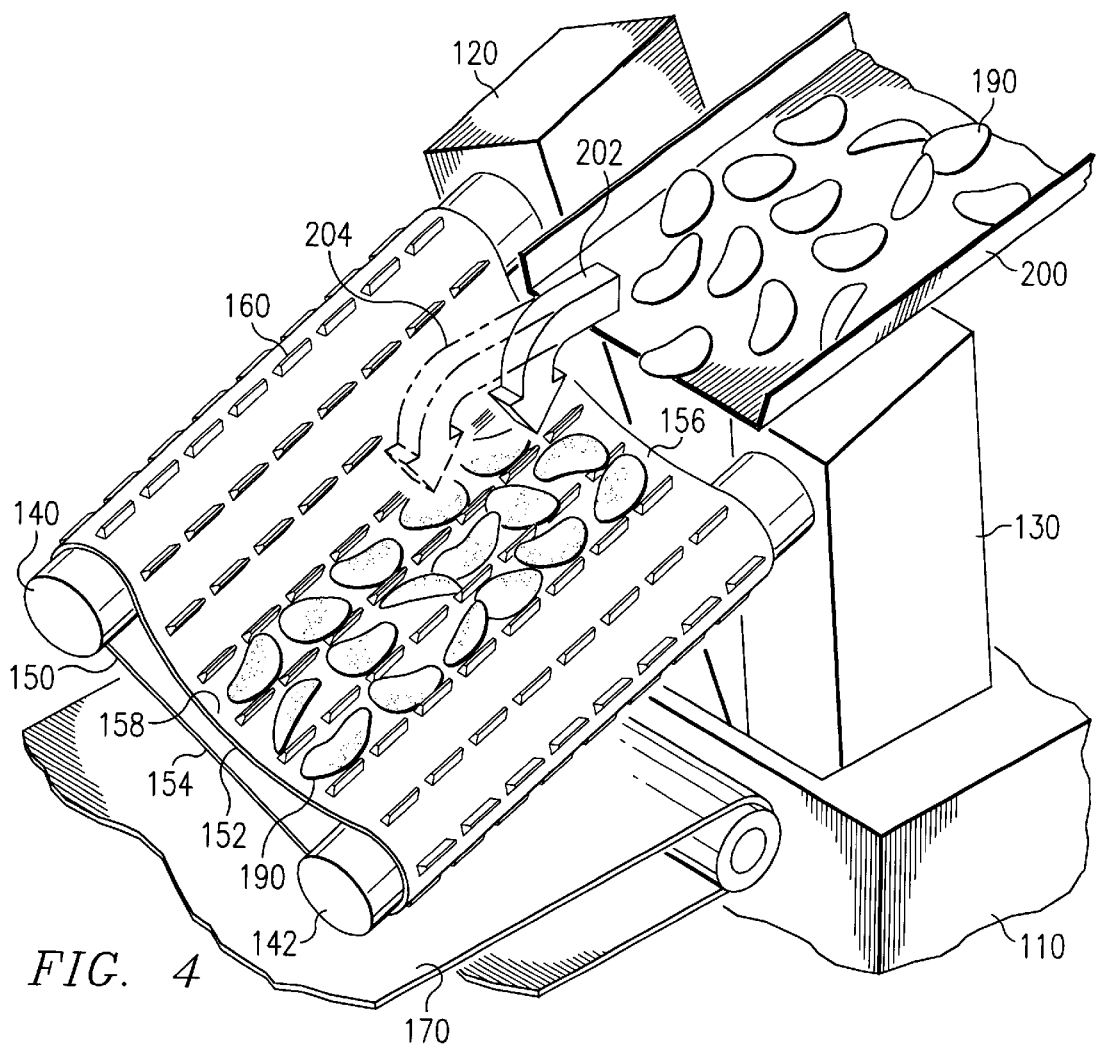
FIG. 4 is a top perspective view of the variable geometry seasoning tumbler in FIG. 2 showing snack food product being processed.

The effect of this rotation of belt 150 is shown in FIGS. 3 and 4. Tumbling of snack food product 190 occurs generally in the catenary portion 152. Seasoning 182 is supplied from a seasoning applicator 180 that is positioned above belt 150 so that seasoning 182 will fall onto snack food product 190 as it tumbles in catenary portion 152. With tortilla chip seasoning, oil is applied to the surface of the chips to promote seasoning adhesion to the surface of the chips. Therefore, oil application equipment (not shown) is generally located toward the entrance of seasoning tumblers. With the instant invention, the oil application equipment would be located about where tortilla chips would be introduced onto belt 150. Seasoning 182 is applied a shortly thereafter at a location further down belt 150. This minimizes contamination of the seasoning application equipment with oil.

The length of belt 150 wherein snack food product 190 is tumbled is optimally minimized to a length that includes the zones of application of oil, if utilized, and seasoning, and the space between the zones. In instances where no oil is applied, then the length would be minimized to optimally be no longer than about the zone of application for seasoning. Minimizing the time that snack food product 190 is tumbled generally reduces the amount of snack food product breakage.

The tumbling motion is exemplified in FIG. 3 wherein snack food product 190 is tumbled in a product bed 162 with an elliptical path. This is similar to tumbling path that would occur in a conventional tumbling drum. Snack food product 190 is supplied from snack food product supply 200 onto belt 150. Depending on the amount of tumbling time desired, the depositing position of snack food product onto belt 150 can be altered by adjusting the position of supply 200. The depositing position is shown with arrow 202 and arrow 204 (shown in phantom to show an alternative position on belt 150). In addition to the depositing position, tumbling time can be varied by adjusting the rotational speed of belt 150, changing the inclination of the belt 150, or by some combination thereof. In a preferred embodiment however, having the ability to introduce the product to the tumbling area of belt 150 farther along its length is desirable to adjust tumbling time independent of other factors to affect seasoning coverage.

Once deposited onto belt 150 at product entrance 156, snack food products 190 are captured by flights 160 that protrude upward from belt 150. The snack food product then travels upward towards roll 140 until snack food product 190 falls free from flights 160 due to the increasing slope of belt 150 as it travels upward toward roll 140. Snack food product 190 will then fall back down toward roll 142 and will be picked up again by more flights 160 rotating further down on belt 150 towards the product exit 158 on belt 150. This process repeats until snack food product 190 reaches the exit on belt 150. The result of this process is that the bed of tumbling snack food product is cradled and tumbled in the catenary portion 152. After exiting belt 150, seasoned snack food product 190 is then deposited onto belt 170 for transport to product packaging or additional processing.

Figure 5:
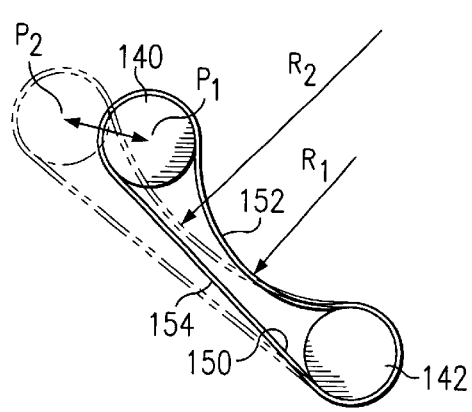
FIG. 5 is a cross-sectional view of the variable geometry seasoning tumbler in FIG. 2 showing curvature changes of the catenary portion of the belt of the tumbler.
Figure 6:
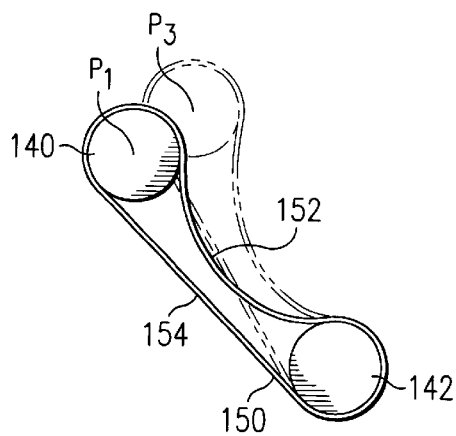
FIG. 6 is a cross-sectional view of the variable geometry seasoning tumbler in FIG. 2 showing movement of the upper support roll to effect a change in inclination in the tumbling bed.

FIGS. 5 and 6 show different positions of rolls 140, 142 to control the radius of curvature of the belt catenary and lateral inclination of the tumbling surface of belt 150. The radius of the tumbling surface is increased from $R_1$ to $R_2$ as shown in FIG. 5 by moving roll 140 backward away from roll 142. This results in moving belt 150 from position $P_1$ to position $P_2$ (shown in phantom). The tumbling region in catenary portion 152 can be adjusted to allow for narrow, deep product bed 162 with close roll spacing between rolls 140 and 142 or to allow for wide, shallow product bed 162 with wide roll spacing between rolls 140 and 142. With FIG. 6, by moving the roll 140 forward and upward relative to roll 142 will increase the inclination of the tumbling bed 162. This results in moving belt 150 from position P1 to position P2 with snack food product being tumbled more rapidly. Selection of the positioning of rolls 140, 142 is dependent on the product being seasoned and the desired seasoning effect. By altering the horizontal and vertical separation between rolls 140, 142, the tumbling action and product bed depth can be controlled.

Figure 7:
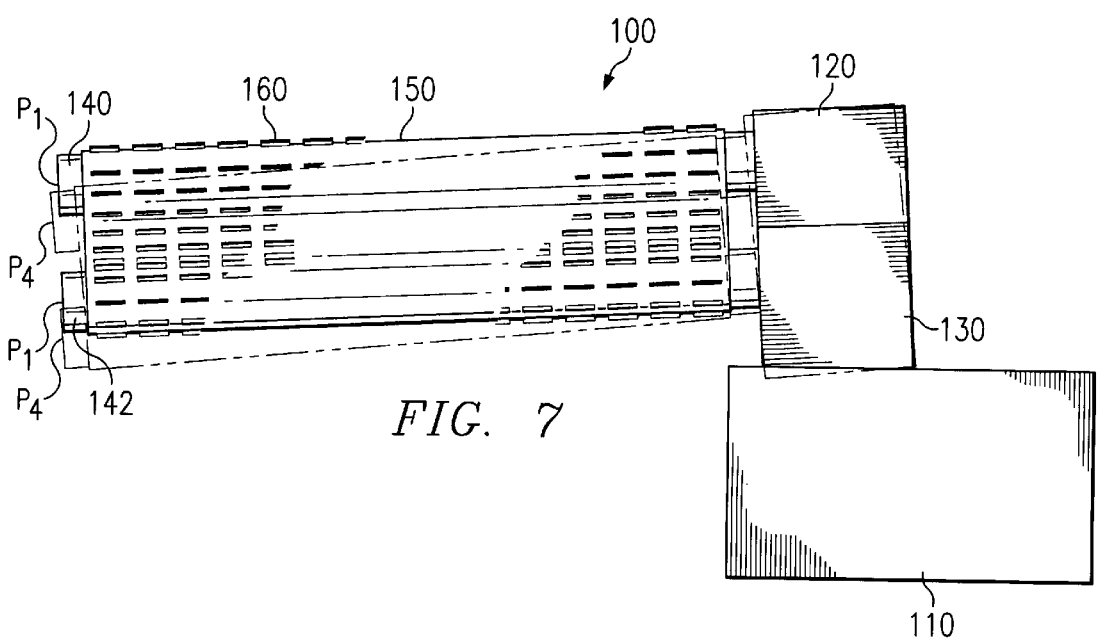
FIG. 7 is a front elevational view of the variable geometry seasoning tumbler in FIG. 2 showing movement of both support arms for both rolls being adjusted to change the inclination of the entire belt.

To change the inclination of the entire belt 150, both rolls 140, 142 can be adjusted as shown in FIG. 7. When both rolls 140, 142 are moved downward to increase the slope of tumbling bed 162, assembly 100 moves from position $P_1$ to position $P_4$. As the slope is increased, the rate of travel of snack food products 190 across belt 150 is increased. This is an additional parameter to control product seasoning.

With the above described invention, seasoning can be applied to snack food product with uniform seasoning coverage with minimum product breakage. The seasoning assembly achieves this with its flexible surface of variable curvature that is easily changeable to desirable parameters depending upon the product being tumbled. Another advantage is that the tumbling device of the seasoning assembly is used to tumble product in an open environment as opposed to an internal surface of conventional tumbling drum. This facilitates sanitation of the device and enables use of powder dispensers or coating applicators that are generally too large to fit into the inside of a conventional tumbling drum.

While the invention has been particularly shown and described with reference to a preferred embodiment, it will be understood by those skilled in the art that various changes in form and detail may be made therein without departing from the spirit and scope of the invention.

What is claimed is:

1. A seasoning assembly for use with seasoning snack food product comprising:
    a tumbler, the tumbler comprising an adjustable upper support roll; an adjustable lower support roll; a belt suspended between the upper and the lower support rolls for receiving and processing the snack food product, the belt having a top surface and a taut bottom surface; and
    a catenary region formed by a slack portion in the top surface of the belt and providing a product bed for tumbling the snack food product; and
    a seasoning applicator positioned above the belt of the tumbler to dispense seasoning on snack food product received by the belt.

2. The seasoning assembly of claim 1 wherein the tumbler further comprises at least one of flights or cleats protruding upwards from the top surface of the belt for lifting snack food product received by the belt upward towards the upper support roll.

3. The seasoning assembly of claim 1 wherein the tumbler further comprises a drive mechanism positioned to rotate the lower support roll and cause the belt to rotate in the direction of the upper support roll.

4. The seasoning assembly of claim 3 wherein the drive mechanism is adjustable to cause the belt to rotate in the direction of the upper support roll at a speed that is adjustable, thereby causing a tumbling time for snack food product on the belt to be adjustable.

5. The seasoning assembly of claim 1 further comprising:
    an adjustable receiving point on the top surface of the belt providing a deposit area for snack food product;
    a terminal end on the top surface of the belt providing an exit for snack food received by the belt; and
    a snack food product supply positioned to deposit the snack food product at the receiving point on the top surface of the belt, wherein the snack food product supply is adjustable to cause the snack food product to be deposited at a receiving point that is adjustable, thereby making adjustable time that elapses from receiving of the snack food product on the belt to exiting of the snack food product at the terminal end of the belt.

6. The seasoning assembly of claim 5 wherein the snack food product supply is positioned to deposit snack food product onto the belt at a receiving point generally in the catenary region.

7. The seasoning assembly of claim 5 wherein the snack food product supply is positioned to deposit the snack food product at a receiving point located at a height above a terminal end of the belt where the snack food product exits the belt.

8. The seasoning assembly of claim 1 wherein the seasoning applicator is positioned above the catenary region.

9. The seasoning assembly of claim 1 wherein the catenary region of the belt has an adjustable curvature.

10. The seasoning assembly of claim 9 wherein adjustment of the curvature is effected by adjustment of the upper support roll.

11. The seasoning assembly of claim 1 wherein the belt has an adjustable slope extending from a snack product receiving point on the top surface of the belt to a snack product departure point on the top surface of the belt.

12. The seasoning assembly of claim 11 wherein adjustment of the slope is effected by joint adjustment of the upper and lower support rolls.

13. The seasoning assembly of claim 11, wherein the slope extending from the snack product receiving point to the snack product departure point is adjustable to adjust time that elapses from receiving of the snack food product at the snack product receiving point to departing of the snack food product at the snack product departure point.

14. A seasoning tumbler for use with seasoning snack food product, comprising:
    an adjustable upper support roll;
    an adjustable lower support roll;
    a belt suspended between the upper and the lower support rolls for receiving and processing the snack food product, the belt having a top surface and a taut bottom surface;
    at least one of flights or cleats protruding upwards from the top surface of the belt;
    a catenary region formed by a slack portion in the top surface of the belt creating a tumbling product bed for the processing of the snack food product; and
    a seasoning applicator positioned above the belt of the tumbler to dispense seasoning on snack food product received by the belt.

15. The seasoning tumbler of claim 14, further comprising an adjustable drive mechanism positioned to rotate the lower support roll and cause the belt to rotate toward the upper support roll at a, that is adjustable, thereby causing the snack food product to travel along the belt in an amount of time that is adjustable.

16. The seasoning tumbler of claim 14, further comprising a receiving point generally located in the catenary region in the top surface of the belt for receiving snack food product; and a terminal end located on the top surface of the belt at a distance below the receiving point and providing an exit where processed snack food departs.

17. The seasoning tumbler of claim 14, wherein the catenary region of the belt has a curvature that is adjustable with adjustment of the upper support roll.

18. The seasoning tumbler of claim 14, wherein the belt has an adjustable slope extending from a snack product receiving point on the top surface of the belt to a snack product departure point on the top surface of the belt, the slope being adjustable with joint adjustment of the upper and lower support rolls.

19. The seasoning tumbler of claim 14, wherein the upper support roll and the lower support roll are each connected to a support arm.

20. The seasoning assembly of claim 18, wherein the slope extending from the snack product receiving point to the snack product departure point is adjustable to adjust time that elapses from receiving of the snack food product at the snack product receiving point to departing of the snack food product at the snack product departure point.

21. A tumbler for use with tumbling snack food product comprising:

a positionally adjustable upper support roll;

a positionally adjustable lower support roll;

a belt suspended between the upper and the lower support rolls for receiving snack food product, the belt having a top surface and a taut bottom surface; and an adjustable catenary region formed in the top surface of the belt and providing a product bed for tumbling the snack food product, the catenary region being adjustable by adjustment of a position of the upper support roll with respect to a position of the lower support roll.

22. The tumbler of claim 21, further comprising:

a seasoning applicator positioned above the belt to dispense seasoning on snack food product received by the belt.

23. The tumbler of claim 21, further comprising oil application equipment positioned above the belt to apply oil on snack food product received by the belt.

* * * * *